L. S. LACHMAN.
PROCESS OF JOINING METAL.
APPLICATION FILED JUNE 16, 1910.
1,101,858.
Patented June 30, 1914.
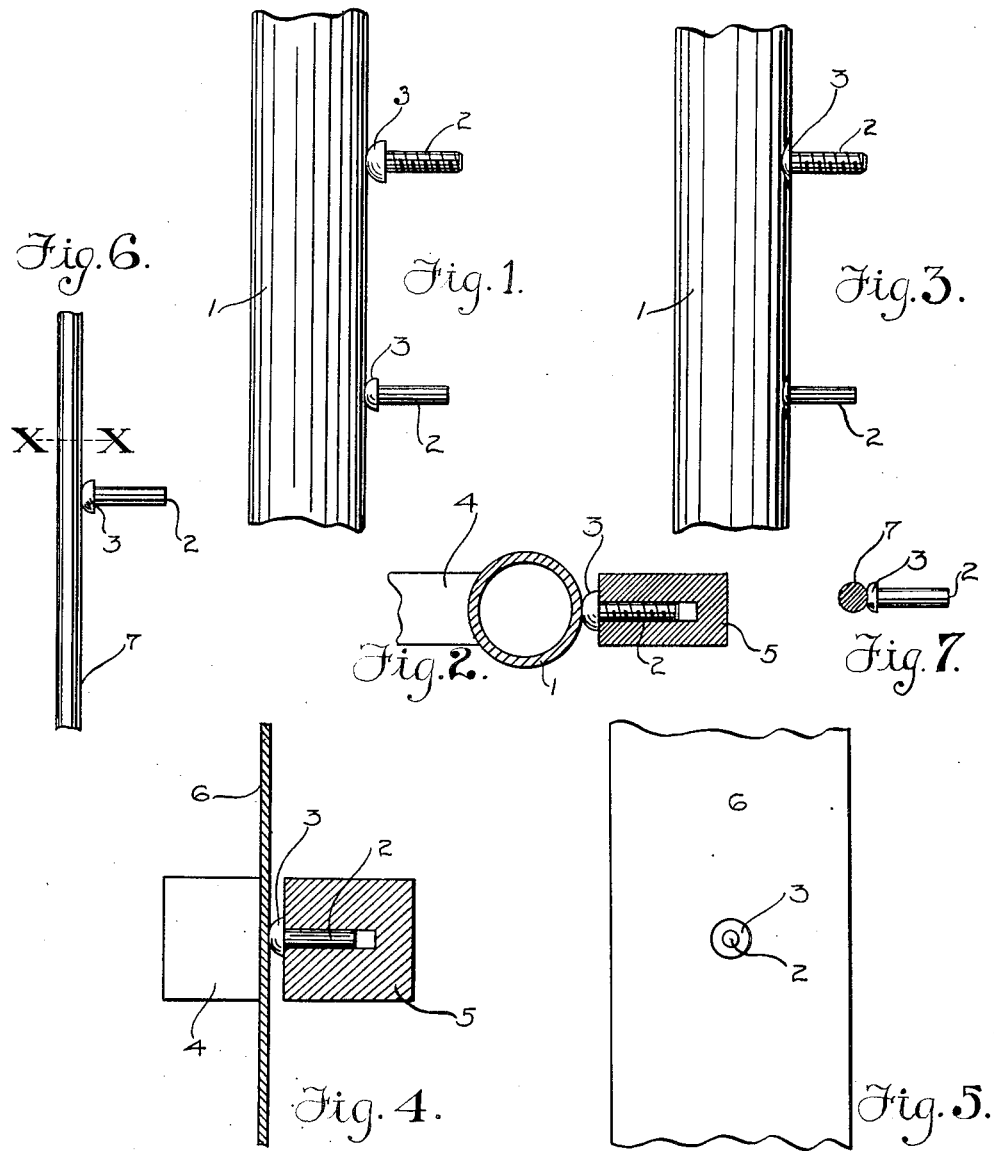
Witnesses:
Inventor
LAURENCE S. LACHMAN.
By his Attorneys

UNITED STATES PATENT OFFICE.

LAURENCE S. LACHMAN, OF NEW YORK, N. Y., ASSIGNOR TO UNIVERSAL ELECTRIC WELDING COMPANY, OF LONG ISLAND CITY, NEW YORK, A CORPORATION OF NEW YORK.

PROCESS OF JOINING METAL.

1,101,858.  Specification of Letters Patent.   Patented June 30, 1914.

Application filed June 16, 1910. Serial No. 567,152.

*To all whom it may concern:*

Be it known that I, LAURENCE S. LACHMAN, a citizen of the United States, and a resident of New York, in the county of New York and State of New York, have invented certain new and useful Improvements in Processes of Joining Metal, of which the following is a specification.

My present invention relates to processes of joining pieces or parts of metal to produce composite metal work and particularly to those forms in which one of the members projects in a lateral direction from the other member.

The object of the invention is to secure the parts to each other by means of an electric welding process whereby the cost of production is greatly decreased over mechanical ways of securing the parts and further to secure the parts by electric welding that the use of finishing tools or processes to remove the bur caused by using this welding process will be avoided.

A further object is to dispense with the necessity of clamping devices to hold the parts securely when heating and applying the welding pressure.

The invention consists in the new and novel process of securing the parts of composite metal work hereinafter more particularly described and then specified in the claims.

In the accompanying drawings, Figure 1 is a side elevation of a device showing members in position previous to welding in accordance with this invention. Fig. 2 is a plan and partial section of the parts shown in Fig. 1 before welding. Fig. 3 is a side elevation of the device shown in Fig. 1 after welding the parts together. Fig. 4 illustrates a modified form of work, the parts being held between suitable clamping electrodes. Fig. 5 is a front elevation of the work illustrated in Fig. 4. Fig. 6 illustrates a modification in the form of the members to be joined and Fig. 7 is a horizontal section through the same on the line X X.

To illustrate my present invention, it is shown as applied to joining pieces of metal of various shapes and forms but it will be understood that the invention as set out in the appended claims is not limited to the particular forms of the parts shown but is equally applicable to numerous other forms in which it is desired to have one member project in a lateral direction from the other.

Referring to the drawings, Figs. 1, 2 and 3, 1 indicates a tubular length of metal to which the pins 2 are to be secured. The pins 2 might be of any desired character such as a screw, rivet, split pin or any other form of fastening device or rod which it is desired to secure to the part 1 in a general lateral projecting direction. The pins 2 are provided with a head 3 of larger diameter than the body portion of the pins, the heads having a rounded or convex surface at the apex and a substantially square shoulder at the junction of the head and the body of the pin. The pin is placed against the member or part 1 in such position that the rounded surface of the head 3 butts against the side or periphery of the part 1 and the pin 2 projects in a general lateral direction therefrom. The parts are assembled between suitable current carrying electrodes of any suitable kind whereby the parts may be joined together by the employment of the electric welding process now well known in the art. One manner of so joining them is illustrated in Fig. 2 in which 4 indicates one of the electrodes adapted to engage the outer periphery of the tubular member 1 in a line with the pin 2. The other electrode, indicated at 5, is preferably bored out to permit the insertion of the body of the pin 2, the shoulder at the head seating on the outer surface of the electrode, one of the objects of the shoulder being that it affords an abutment against which the electrode presses when applying the welding pressure necessary to complete the welding operation and thus expensive and troublesome clamping devices to grip the periphery of the pin are avoided. As is now well known to those skilled in the electric metal working art, the electric current passes from the one electrode to the other and softens the work at the junction of the two parts and by simultaneously applying pressure thereto the parts become integrally united. As the current flows from one part to the other and pressure is applied the head 3 coalesces with the metal of the member 1, the attendant bur caused by the upsetting pressure being taken up in the space between the rounded head and the surface of the member 1, whereby, when the welding operation is finished, a clean bearing surface is left at the shoulder of the head, whereby the necessity of using any finishing tool to remove the bur is avoided. This is important as often the necessity of removing the bur after welding makes the use of the electric welding process prohibitive. By providing the pin with a rounded surface a restricted area of contact is attained with the opposite part, whereby initial contact of small area to readily start the heating is provided. As shown in Fig. 3, the upsetting pressure is continued until the shoulder on the pin comes into alinement with the vertical line of the surface of the member 1, but obviously, if desired, the welding operation might be completed before this time and the shoulder be raised more or less from the surface of the member to which the pin is secured. Also it will be understood that the electrode 4 might be of such form as to enter within the tube 1 and engage the inner periphery of the tube if desired and as well understood in the art.

In the form illustrated in Figs. 4 and 5 the pin 2 is welded to the surface of a plate 6 in a similar manner to that previously described, the bur being taken up by the space between the rounded head 3 and the surface of the plate 6.

In Figs. 6 and 7 the pin is shown as to be welded to a rod 7, the bur after welding being all located back of the shoulder on the pin, whereby a clean, square bearing surface is provided against which parts which are to be fastened to the rod 7 may squarely seat.

What I claim as my invention is:

1. The process of making composite metal work consisting in providing a member having a rounded head, contacting said rounded head with a surface of another member and welding it thereto by said rounded head.

2. The process of making composite metal work consisting in providing a member having a convexed surface head and a shank of smaller diameter than the head, contacting the head of said member with a surface of another member and welding said contacting surfaces together.

3. The process of joining a laterally projecting stud to a support consisting in providing the stud with a rounded head of larger diameter than the stud, placing the head of said stud in contact with a surface of the support, passing an electric current from one to the other and applying pressure whereby said stud is integrally united with said support by said head.

4. The process of joining a laterally projecting stud to a support having a rounded surface consisting in providing a stud having a rounded head joined to the shank of the stud by a substantially square shoulder, placing the head of the stud in contact with the rounded surface of the support, passing an electric current from one part to the other and applying pressure to force the parts together, whereby said stud is integrally united with the support and a substantially square shoulder is maintained at the juncture between the stud and its head.

5. The process of joining a laterally projecting stud to a support consisting in providing a stud having a head with a curved surface joined to the shank of the head by a substantially square shoulder, placing the curved surface of the head in contact with the surface of the support between current-carrying electrodes, passing an electric current from one electrode to the other through the assembled parts and applying pressure to force the parts together, whereby said stud is integrally united with the support and a substantially square shoulder is maintained at the juncture between the stud and its shank.

Signed at New York in the county of New York and State of New York this 14th day of June A. D. 1910.

LAURENCE S. LACHMAN.

Witnesses:
IRENE LEFKOWITZ,
FREDERICK S. BORDEN.